United States Patent [19]
Pridmore

[11] 4,095,143
[45] June 13, 1978

[54] ELECTRON BEAM CROSSOVER CORRECTION CIRCUITRY

[75] Inventor: Lawrence W. Pridmore, Elba, N.Y.

[73] Assignee: GTE Sylvania Incorporated, Stamford, Conn.

[21] Appl. No.: 707,190

[22] Filed: Jul. 21, 1976

[51] Int. Cl.² ............................................. H01J 29/56
[52] U.S. Cl. ................................................. 315/370
[58] Field of Search ...................... 315/13 C, 368, 370, 315/371

[56] References Cited

U.S. PATENT DOCUMENTS

| | | | |
|---|---|---|---|
| 2,561,586 | 7/1951 | Montgomery | 315/371 |
| 3,688,156 | 8/1972 | Utsunomiya et al. | 315/13 C |
| 3,851,215 | 11/1974 | Dekeijser et al. | 315/399 X |

FOREIGN PATENT DOCUMENTS 1,048,452  11/1966  United Kingdom ................ 315/370

Primary Examiner—Maynard R. Wilbur
Assistant Examiner—T. M. Blum
Attorney, Agent, or Firm—Norman J. O'Malley; Thomas H. Buffton; Robert T. Orner

[57] ABSTRACT

A horizontal electron beam crossover correction circuit for an in-line color cathode ray tube having an associated toroid-wound deflection yoke with first and second horizontal deflection windings each having first and second winding portions coupled to a horizontal deflection signal source includes an adjustable impedance shunting at least one of the winding portions of one of the first and second horizontal deflection windings for controlling current flow in one with respect to the other of the winding portions.

4 Claims, 3 Drawing Figures

HORIZONTAL DEFLECTION SIGNAL SOURCE.

HORIZONTAL DEFLECTION
SIGNAL SOURCE

ELECTRON BEAM CROSSOVER CORRECTION CIRCUITRY

BACKGROUND OF THE INVENTION

One of the problems associated with the manufacture of color cathode ray tubes is crossover of the electron beams emitted from the electron guns as exhibited on the viewing screen of the color cathode ray tubes. Frequently, this crossover condition is due to errors in mounting the electron guns within the envelope of the cathode ray tube. In other words, it is not infrequent to find that the electron guns are mounted within the envelope at a positional location which is either slightly above or slightly below the horizontal axis as seen on the viewing screen.

Other causes of an undesired electron beam crossover condition are rotation of the electron guns within the envelope with respect to the horizontal axis, non-concentricity between the front and back openings of the associated deflection yoke, or undesired variations in the wire positional locations on the deflection yoke associated with the color cathode ray tube. Thus, for any one of the above-mentioned and numerous other conditions the electron beams tend to separate as horizontal deflection or scanning takes place and the phenomenon of crossover is undesirably encountered.

Additionally, it should be noted that this crossover condition is particularly significant for the in-line type of color cathode ray tube wherein all of the electron guns are aligned in a single plane. Also, as is well known, the horizontal deflection windings of toroid-wound deflection yokes are centered on and extend above and below the horizontal axis of the color cathode ray tube while the horizontal deflection windings of basket-wound deflection yokes are disposed above and below the horizontal axis of the color cathode ray tube. Thus, the basket-wound deflection yoke may be electrically altered to compensate for a high or low planar alignment of the electron guns by varying the energy applied to either one of the windings. However, such a feature is not readily available in the toroid-wound deflection yoke since both horizontal deflection windings are centered at and extend above and below the horizontal axis.

OBJECTS AND SUMMARY OF THE INVENTION

An object of the present invention is to reduce and obviate the disadvantages of the prior art. Another object of the invention is to improve the capabilities of in-line color cathode ray tube and toroid-wound deflection yoke electron beam alignment. Still another object of the invention is to provide enhanced apparatus for correcting electron beam crossover conditions in an in-line color cathode ray tube.

These and other objects, advantages and capabilities are achieved in one aspect of the invention by a crossover correction circuit for an in-line color cathode ray tube having an associated toroid-wound deflection yoke with first and second horizontal deflection windings each with a first and second winding portion wherein an adjustable impedance shunts at least one of said first and second winding portions of one of the first and second horizontal deflection windings to effect an imbalance of current flow between the first and second winding portions of one of the first and second horizontal deflection windings.

PREFERRED EMBODIMENT OF THE INVENTION

For a better understanding of the present invention, together with other and further objects, advantages and capabilities thereof, reference is made to the following disclosure and appended claims in conjunction with the accompanying drawings.

Figure 1:
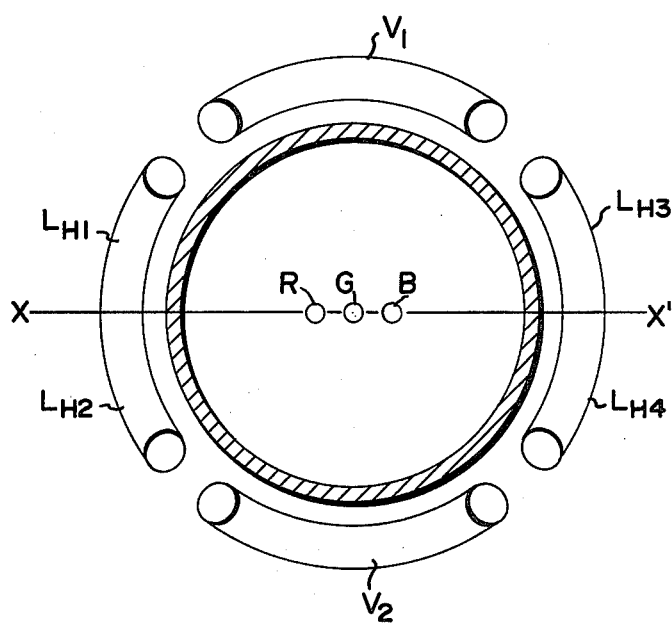
FIG. 1 is a cross-sectional illustration showing the relationship of a toroid-wound deflection yoke and an in-line color cathode ray tube.

Referring to the drawings, FIG. 1 is a cross-sectional view illustrating a color cathode ray tube of the in-line type. Therein, three electron guns, usually referred to as the red, green, and blue guns, R, G, B, are horizontally aligned in a plane on the horizontal axis, X–X' of a color cathode ray tube.

Associated with and surrounding the neck portion of the in-line color cathode ray tube is a toroid-wound deflection yoke. The toroid-wound deflection yoke includes first and second vertical deflection windings $V_1$ and $V_2$ respectively disposed above and below the horizontal axis X–X' of the in-line color cathode ray tube. These vertical deflection windings $V_1$ and $V_2$ are coupled to a vertical deflection signal source (not shown) to effect alterations in the electron beams in the direction of the vertical axis of the color cathode ray tube.

Also, the toroid-wound deflection yoke includes a first horizontal deflection winding having a first winding portion $LH_1$ disposed above and a second winding portion $LH_2$ disposed below the horizontal axis X–X' of the color cathode ray tube. A second horizontal deflection winding is positionally located on the opposite side of the vertical axis of the color cathode ray tube. This second horizontal deflection winding includes a first winding portion $LH_3$ disposed above and a second winding portion $LH_4$ disposed below the horizontal axis X–X' of the color cathode ray tube.

As can readily be understood, manufacturing cathode ray tubes and toroid-wound deflection yokes to provide a deflection system for a television receiver requires accurate assembly of the red, green and blue (RGB) electron guns and accurate placement of the electron gun assembly within the cathode ray tube envelope. Also, the associated toroid-wound deflection yoke must have accurately disposed windings, an accurate and precise configuration for supporting the windings, and be accurately affixed to the neck portion of the cathode ray tube. All of these features are necessary to effect repeatable manufacture of cathode ray tube deflection systems.

Figure 2:
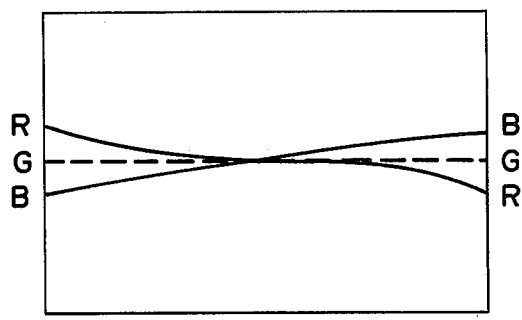
FIG. 2 is a diagrammatic illustration showing crossover of the electron beams as observed on the viewing screen of a color cathode ray tube.

However, undesired deviation from the ideal in one or more of the above-mentioned areas does occur in a manufacturing operation. As a result, an undesired crossover condition of the electron beams during horizontal scan is frequently observed on the viewing screen of the color cathode ray tube. As can be seen in the diagrammatic example of FIG. 2, the electron beams; as exhibited on the viewing screen of the color cathode ray tube, tend to diverge at one or both ends of the horizontal scan trace.

Also, reviewing the illustration of FIG. 1, it can be readily observed that correction of such a divergence of the electron beams tends to present a problem since the horizontal deflection windings of the toroid-wound deflection yoke each extend above and below the horizontal axis X–X'. Thus, correction of the divergent electron beams requires control over a portion of each one of the horizontal deflection windings if the undesired divergence at one or both ends of horizontal scan is to be corrected.

Figure 3:
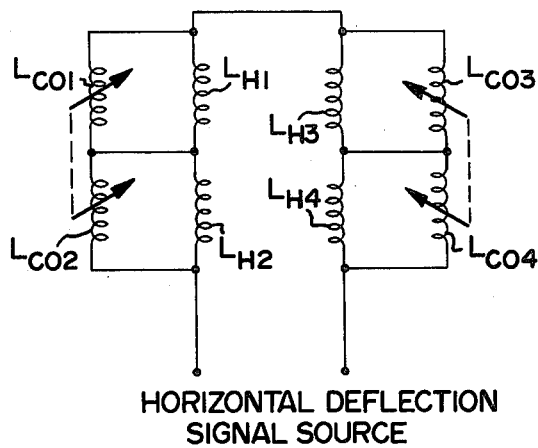
FIG. 3 is a preferred embodiment of an electron beam crossover correction circuit suitable for use with an in-line color cathode ray tube and associated toroid-wound deflection yoke.

Referring to FIG. 3, a preferred form of electron beam crossover compensating circuit includes first and second series connected winding portions $LH_1$ and $LH_2$ of a first horizontal deflection winding and first and second series connected winding portions $LH_3$ and $LH_4$ of a second horizontal deflection winding of a toroid-wound deflection yoke. The first and second horizontal deflection windings are series connected and coupled to a horizontal deflection signal source in a color television receiver.

An adjustable impedance, illustrated as an adjustable inductor, shunts each one of the winding portions $LH_1$, $LH_2$, $LH_3$, and $LH_4$ of the toroid-wound deflection yoke. More specifically, first and second adjustable impedances, in the form of adjustable inductors $L_{co1}$ and $L_{co2}$, are shunted across the first and second series connected winding portions $LH_1$ and $LH_2$ of a first horizontal deflection winding. Similarly, first and second adjustable impedances, in the form of adjustable inductors $L_{co3}$ and $L_{co4}$, are shunted across the first and second series connected winding portions $LH_3$ and $LH_4$ of a second horizontal deflection winding.

Preferably, each of the first and second adjustable impedances, $L_{co1}$ and $L_{co2}$ and $L_{co3}$ and $L_{co4}$ are ganged and differentially connected. In this manner, cuurrent flow through each of the horizontal deflection winding portions, $LH_1$ and $LH_2$ and $LH_3$ and $LH_4$ is readily controlled. Thus, by adjusting impedances associated with the first and second horizontal deflection windings and consequently current flow through the windings, correction of undesired crossover at one or both ends of horizontal scan is effected.

Additionally, it should be noted that electron beam crossover compensation is correctable by circuitry which includes at least one adjustable impedance shunting at least one winding portion of one of the first and second horizontal deflection windings. In other words, current flow control in one of the series connected winding portions $LH_1$ or $LH_2$ and $LH_3$ or $LH_4$ effects current flow in the other and may be utilized to provide a desired correction of the diverging electron beams.

Thus, there has been provided a unique crossover compensation circuit for a deflection system employing an in-line color cathode ray tube and a toroid-wound deflection yoke. The circuitry permits a greatly increased latitude of manufacturing tolerances when combining separate color cathode ray tubes and toroid-wound yokes to provide a deflection system. Moreover, manufacturing efficiencies are enhanced and costs reduced due to the alterable features and capabilities of the design.

While there has been shown and described what is at present considered the preferred embodiments of the invention, it will be obvious to those skilled in the art that various changes and modifications may be made therein without departing from the invention as defined by the appended claims.

What is claimed is:

1. In a color cathode ray tube deflection system having horizontal and vertical axis and an in-line color cathode ray tube providing planar electron beams and an associated toroid-wound deflection yoke having first and second horizontal deflection windings oppositely disposed about said vertical axis and coupled to a horizontal deflection signal source and each horizontal winding having first and second series connected winding portions oppositely disposed about said horizontal axis, an electron beam crossover compensating circuit comprising an adjustable ganged and differentially connected inductance impedance means shunting all of at least one of said first and second winding portions of one of said first and second horizontal deflection windings to effect an imbalance of current in said first and second winding portions of at least one of said first and second horizontal deflection windings.

2. The electron beam crossover compensating circuit of claim 1 wherein said adjustable inductor means includes first and second ganged and differentially connected inductor shunting said first and second winding portions respectively of each of said first and second horizontal deflection windings.

3. The electron beam crossover compensating circuit of claim 1 wherein said adjustable inductance means includes an adjustable inductance shunting each one of said first and second winding portions of each one of said first and second horizontal deflection windings with said adjustable inductance shunting each one of said first and second winding portions differentially coupled therebetween.

4. The electron beam crossover compensating circuit of claim 1 wherein said adjustable inductance means is in the form of first and second adjustable and differentially coupled inductors associated with each one of said first and second horizontal deflection windings whereby current flow in each of the winding portions of each of the horizontal deflection windings is controllable.

* * * * *